(12) United States Patent
Tebbe

(10) Patent No.: US 8,935,998 B1
(45) Date of Patent: Jan. 20, 2015

(54) COMPAC, PORTED CYLINDER CONSTRUCTION FOR AN OPPOSED-PISTON ENGINE

(71) Applicant: Achates Power, Inc., San Diego, CA (US)

(72) Inventor: Michael S. Tebbe, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 14/028,423

(22) Filed: Sep. 16, 2013

(51) Int. Cl.
*F02B 25/08* (2006.01)

(52) U.S. Cl.
USPC .................................. 123/51 BD; 123/193.2

(58) Field of Classification Search
USPC ........................ 123/51 R–51 BD, 193.2, 197.4
See application file for complete search history.

(56) References Cited

U.S. PATENT DOCUMENTS

| | | | | |
|---|---|---|---|---|
| 1,808,664 | A * | 6/1931 | Koschka | 123/41.35 |
| 2,170,020 | A * | 8/1939 | Gerlach | 123/51 BD |
| 2,393,085 | A * | 1/1946 | Wuehr | 123/51 BD |
| 2,624,328 | A | 1/1953 | Grinham et al. | 123/193 |
| 2,925,073 | A * | 2/1960 | Millar | 123/46 R |
| 3,866,581 | A * | 2/1975 | Herbert | 123/51 B |
| 5,213,067 | A * | 5/1993 | Kramer | 123/51 BA |
| 7,438,038 | B2 | 10/2008 | Azevedo et al. | 123/193.2 |
| 8,413,632 | B2 | 4/2013 | Sand | 123/193.2 |
| 2012/0186561 | A1 | 7/2012 | Bethel et al. | 123/51 R |
| 2013/0199503 | A1 | 8/2013 | Callahan et al. | 123/51 R |

FOREIGN PATENT DOCUMENTS

EP      1 124 052 B1    3/2007    ............... F02F 1/42

OTHER PUBLICATIONS

Pirault, J and Flint, M. *Opposed Piston Engines: Evolution, Use, and Future Applications*, SAE International, Warrendale Penna., Oct. 2009, Section 3.2: Junkers Jumo 2005; pp. 55-99.
Pirault, J and Flint, M. *Opposed Piston Engines: Evolution, Use, and Future Applications*, SAE International, Warrendale Penna., Oct. 2009, Section 3.3: Junkers Jumo 2007B2; pp. 102-119.

\* cited by examiner

*Primary Examiner* — M. McMahon
(74) *Attorney, Agent, or Firm* — Terrance A. Meador; INCAPLAW

(57) ABSTRACT

A ported cylinder for an opposed-piston engine has a bore to support movements of a pair of opposed pistons and longitudinally-spaced intake and exhaust ports that are controlled by movements of oppositely-disposed pistons in the bore. The bore includes a central portion where combustion occurs and respective end portions. Each end portion extends from an inner edge of a port to the nearest open end of the cylinder. In the central portion the bore has a standard diameter throughout. The bore has a second, larger diameter in each end portion. When the cylinder liner is cold, the bore diameter transitions continuously in size, from the standard diameter to the larger diameter, in an area running from the central portion to an inner edge of a port. From the inner edge, the bore is of the larger diameter throughout the end portion.

20 Claims, 7 Drawing Sheets

COMPAC, PORTED CYLINDER CONSTRUCTION FOR AN OPPOSED-PISTON ENGINE

RELATED APPLICATIONS

This application contains subject matter related to the subject matter of U.S. application Ser. No. 13/757,220, filed Feb. 1, 2013, for "Reduction of Ring Clipping in Two-Stroke Cycle Engines".

BACKGROUND

The field relates to compact, ported cylinder constructions for two-stroke cycle engines in which the bore diameter of a ported cylinder transitions in the vicinities of the ports to accommodate the passage of piston rings across the ports.

A cylinder for a two-stroke engine may be constructed by boring an engine block or by inserting a liner (also called a sleeve) into a cylindrical space formed in an engine block. The following description presumes a cylinder with a liner construction; however the underlying principles apply as well to a bored construction. For ease of discussion, the terms "cylinder" and "cylinder liner" are used interchangeably.

A cylinder liner of a two-stroke cycle, opposed-piston engine has a bore and intake and exhaust ports located near respective outer extremities of the liner. Each port has bridges separating multiple port openings that are arrayed along a respective circumference of the bore. A cylinder liner so constructed forms a "ported cylinder" when received in an engine. A ported cylinder raises at least two technical challenges to the durability and operation of an opposed-piston engine.

While the engine runs, the bridges of both ports expand inwardly as the cylinder liner thermally cycles during two-stroke operation. Inward expansion of the bridges increases frictional contact of the bridges with piston crowns, which leads to excessive compression ring wear, increased blow-by, and undesirable oil consumption as the pistons traverse the ports. One way to mitigate the effects of expansion of the port bridges is by provision of a cylinder bore construction in which the bore diameter is changed from a first size in central and end portions of the bore to a second, greater size in longitudinally-separated, annular areas of the bore where the bridges are located. Since engine specifications such as compression ratio are referenced to the first diameter, it may also be referred to as the "standard" (or "spec") diameter. Each of the annular areas contains the ends of the bridges and the openings of one of the ports. The recess formed in an annular area by the larger diameter is referred to as a "belly". A belly construction allows port bridges to expand inwardly as the cylinder liner thermally cycles, without protruding into bore space within the standard diameter.

In a ported cylinder of an opposed-piston engine, the bore is lubricated by oil splashed into the piston/bore interfaces at the ends of the cylinder, from where it is transported further into the bore on the external surfaces of the piston skirts and compression rings as the pistons advance toward top dead center locations during a compression stroke. It is desirable to limit the oil deposited on the pistons' skirts and compression rings to an amount sufficient to lubricate the piston/bore interface. Excess oil carried in this manner across the exhaust and intake ports will mix with scavenging air in the combustion space, reducing combustion efficiency, fouling the piston crowns, and producing undesirable exhaust components. Unburnt oil will also mix in the exhaust gasses, further contaminating the combustion products. One means of removing excess oil from the piston/bore interfaces in a ported cylinder of an opposed-piston engine is provision of oil scraper rings that act between the lower portions of the skirts and the end portions of the cylinder bore between the ports and the open ends of the cylinder. In a preferred construction, an oil scraper ring is seated in an annular groove on the lower portion of a piston skirt, and wipes excess oil from the bore as the piston approaches bottom dead center near the end of an expansion stroke.

In a ported cylinder with a belly construction, it is not desirable for the oil scraper rings to traverse the ports. At the end of a compression stroke, when the pistons are at top dead center, the ports have cooled sufficiently for the annular areas comprising the bellies to contract, thereby increasing the bore diameters in the bellies. If the oil compression rings traverse the ports, the gaps in the oil control rings can open circumferentially into the annular area due to the change in bore diameters, thereby increasing the risk of ring wear and, possibly, failure. This restriction on the locations occupied by the oil scraper rings results in a longer cylinder. Addition of the extra length for two opposed pistons to the longer cylinder length dictates smaller connecting rod angles, which for some opposed-piston architectures results in longer connecting rods and an increase in overall engine length.

It therefore would be advantageous to reduce the overall length of the ported cylinder without risking oil consumption and damage to the oil scraper rings and reducing performance and durability of the engine. The following specification describes a ported cylinder construction that leads to a reduction in cylinder length while at the same time providing friction reduction in the bore, reduced liner and piston packaging, and overall reduction in the engine dimension that corresponds with the cylinder length.

SUMMARY

In a compact, ported cylinder liner construction for an opposed-piston engine, the liner has a central portion where opposed pistons reach respective top dead center locations to form a combustion chamber. The central portion transitions to respective end portions that extend from the intake and exhaust ports to respective ends of the liner. A respective piston bottom dead center position is located in each end portion. An end portion includes the bridges and openings of a port and the remaining liner portion from the port to the nearest open end of the liner. In an end portion, the port is contained between inner and outer edges, wherein the end portion transitions to the central portion at the inner edge and the outer edge is between the inner edge and a respective end opening of the liner. The bore has a first, standard diameter throughout the central portion that transitions to a second diameter, greater than the first diameter, throughout each of the end portions. In some aspects the transition in diameter size occurs in the vicinity of the inner edges of the ports.

In some aspects, a compact, ported cylinder liner for an opposed-piston engine includes a bore with a central portion that transitions to respective, longitudinally-spaced end portions, an exhaust port in a first end portion, and an intake port in a second end portion. The central portion has a first, standard diameter that transitions to a second diameter, greater than the first diameter in respective areas between the central portion and the two end portions. The bore diameter is constant at the second size in each of the end portions.

Providing a single transition in diameter size between the central portion and each end portion maintains the advantages of the belly construction, with at least two additional benefits. First, the belly construction imposes a transition in bore diameter at the inner and outer edges of each port. Thus the upper rings of each piston undergo four bore diameter changes each cycle of engine operation. However, with a single diameter change at each end of the cylinder liner, the number of transitions is reduced to two, thereby reducing frictional losses at the ring/bore interface. Second, discontinuous, stepwise transitions can lead to ring clipping, so the transitions in the belly construction are made continuous. Given that it is desirable to keep the gaps of oil scraper rings closed throughout engine operation, the belly construction requires that each piston have a skirt long enough to keep its oil scraper ring from entering the diameter transition adjacent the outside edge of the port it controls when it is at top dead center. But, with the elimination of the diameter transition at the outer edge of the port, the oil scraper ring can more closely approach the outside edge when the piston is at top dead center, thereby allowing the length of the piston skirt to be reduced. Reduction of the lengths of two opposed pistons leads to reduction in cylinder length and a decrease in the corresponding dimension of an opposed-piston engine.

DETAILED DESCRIPTION

A ported cylinder for an opposed-piston engine has a bore to support movements of a pair of opposed pistons and longitudinally-spaced intake and exhaust ports that are controlled by movements of oppositely-disposed pistons in the bore. The bore includes a central portion where combustion occurs and respective end portions. Each end portion extends from an inner edge of a port to the nearest open end of the cylinder. In the central portion the bore has a standard diameter throughout. The bore has a second, larger diameter in each end portion. When the cylinder liner is cold, the bore diameter transitions continuously in size, from the standard diameter to the larger diameter, in an area running from the central portion to an inner edge of a port. From the inner edge, the bore is of the larger diameter throughout the end portion.

Figures 1, 2:
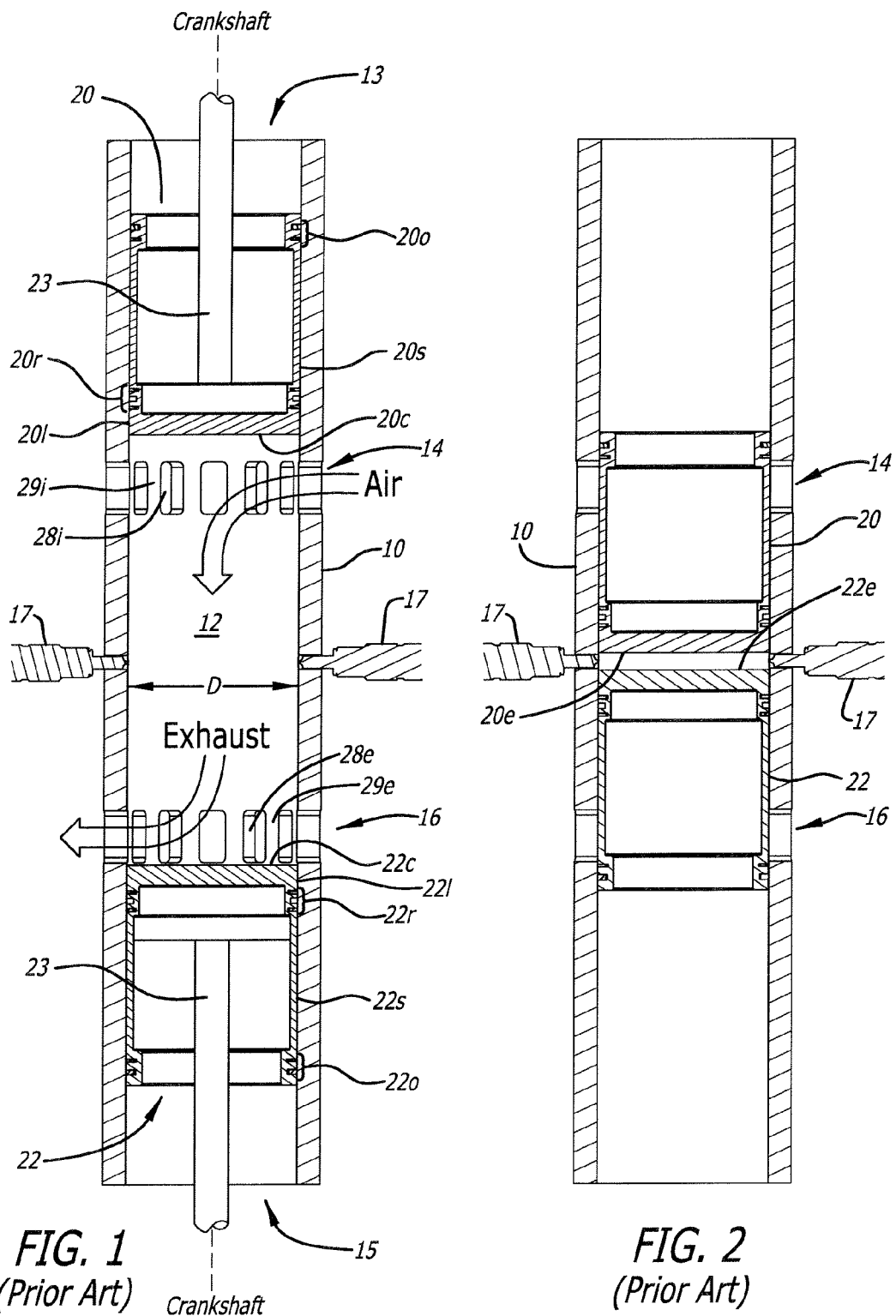
FIG. 1 is a side sectional, partially schematic drawing of a cylinder of a prior art opposed-piston engine with opposed pistons near respective bottom dead center ("BDC") locations, and is appropriately labeled "Prior Art".
FIG. 2 is a side sectional partially schematic drawing of a cylinder of a prior art opposed-piston engine with opposed pistons near respective top dead center ("TDC") locations, and is appropriately labeled "Prior Art".

FIGS. 1 and 2 show cross-sectional views of a ported cylinder 10 for an opposed-piston engine. Although the orientation of the cylinder is presumed to be vertical, this is not intended to be limiting. In fact, when incorporated into an opposed-piston engine, the orientation may vary between vertical and horizontal, depending on the engine design. The cylinder 10 has a bore 12 and longitudinally-spaced intake and exhaust ports 14 and 16 located near the open ends 13 and 15 of the cylinder 10. During engine operation, pistons 20 and 22 move in opposition in the bore 12. As seen in FIG. 1, each of the pistons is equipped with a connecting rod 23 that couples it to a crankshaft; for ease of illustration, the connecting rods are omitted from the remaining figures. The movements of the pistons 20 and 22 control the operations of the ports 14 and 16. In FIG. 1, the pistons 20 and 22 are located at, or near their respective BDC locations in the bore 12. In this figure both ports 14 and 16 are fully open; that is to say, they are not obstructed by the pistons 20 and 22. FIG. 2 shows the pistons located at, or near, their respective TDC positions. In a two-stroke cycle operation the pistons 20 and 22 slide in the bore 12 from BDC positions to TDC positions in a compression stroke and return to BDC positions in an expansion stroke.

Each piston has a crown 20c, 22c and a skirt 20s, 22s. The crown has an upper land 201, 221 and a series of circumferential ring grooves to support compression rings 20r, 22r. Circumferential grooves in the lower portion of the piston skirt support oil scraper rings 20o, 22o. The exhaust and intake ports 14 and 16 of the cylinder 10 are similarly constructed. In this regard, each port includes at least one sequence of openings 28i, 28e through the sidewall of the cylinder 10. For example, the openings extend in a circumferential direction of the cylinder. The openings 28i, 28e are separated by bridges 29i, 29e (sometimes called "bars"). Relatedly, the term "port" in this description refers to an alternating series of openings and bridges peripherally spaced around the cylinder near one of its ends. In some descriptions the openings themselves are called ports; however, the construction of one or more peripheral sequences of such "ports" is no different than the port constructions shown and described herein.

In a two-stroke cycle of an opposed-piston engine with one or more cylinders constructed according to FIGS. 1 and 2 presume that the pistons 20 and 22 are in the central portion of the cylinder 10, near TDC, at the moment of combustion as shown in FIG. 2. When combustion occurs, the pistons 20 and 22 are driven outward towards their BDC positions in respective intake and exhaust end portions of the cylinder 10. In some cases, the pistons may be out of phase with one another. For example, the exhaust piston 22 may lead the intake piston 20, in which case the exhaust port 16 will be opened before the intake port 14. As the exhaust piston 22 traverses the exhaust port 16 toward BDC combustion gases will start to exit the exhaust port. The intake port 14 will then open as the intake piston 20 traverses it toward BDC and pressurized fresh air will enter the cylinder bore 12 and start scavenging any remaining combustion gases out of the exhaust port 16. As the pistons 22 and 20 travel through their respective BDC positions and start to return to TDC as per FIG. 1, the exhaust port 16 is closed by the exhaust piston 22 while the intake port remains 14 open allowing pressurized air to continue flowing into the cylinder bore 12 until the intake port 14 is closed by the intake piston 20. At this point, as the intake and exhaust pistons 20 and 22 continue sliding towards TDC the air in the cylinder bore 12 is increasingly compressed, which raises its temperature. When the end surfaces 20e and 22e of the two pistons are adjacent as per FIG. 2, fuel is injected into the heated, compressed air through one or more injectors 17 and the air/fuel mixture ignites, initiating an expansion stroke.

The cylinder 10 is formed with the bore 12 having a diameter D throughout its length. However, during the expansion stroke hot gases, (combusted fuel and air and combustion byproducts), particularly at the exhaust port 16 but also present to a degree at the intake port 14 when EGR is incorporated, cause inward expansion of the port bridges 29i and 29e. This inward expansion of the cylinder bore 12 in the vicinity of the ports 14 and 16 can result in piston land contact with the bridges, excessive compression ring wear, and blow-by, as well as excessive oil consumption during engine operation as the pistons traverse the ports.

Figure 3A:
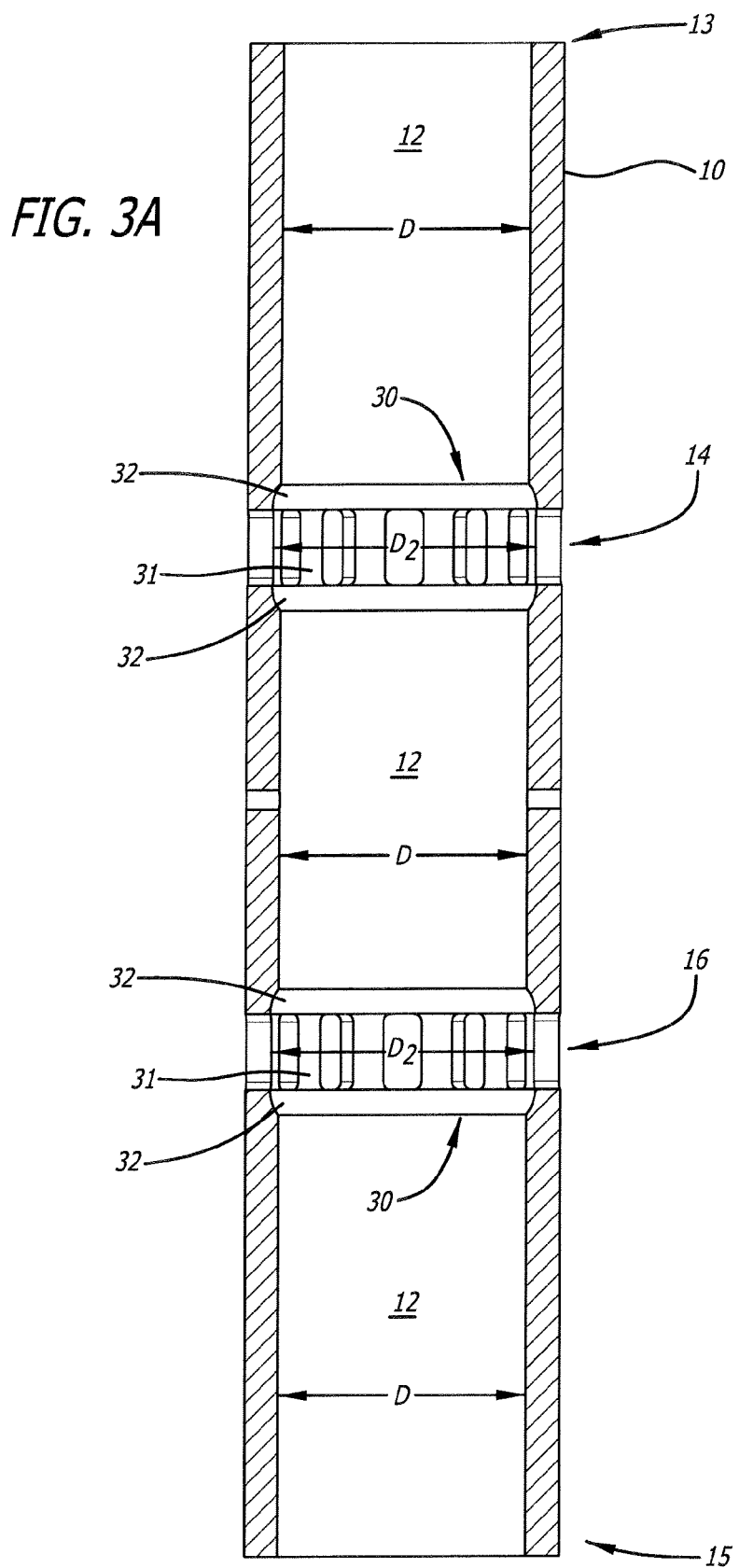
FIG. 3A is a cross sectional view of a ported cylinder of an opposed-piston engine showing a bore with trenched annular areas through which longitudinally-spaced intake and exhaust ports.

One solution to this problem is to modify the construction of the cylinder 10 according to FIG. 3A. In this regard, a belly in the form of a circumferential trench 30 is made (for example, by honing) in each annular area of the bore 12 that contains a port 14, 16. According to one technique useful to produce this construction, the entire cylinder bore 12 is first honed to a standard diameter D, and then additional honing is done to remove additional bore material in longitudinally-spaced annular areas spanning the ports, thereby. Each of the resulting trenches 30 has a flat band 31, perforated by the port openings, at the greater diameter $D_2$ that spans the port openings and sides 32 that transition continuously from one diameter to the other to ensure that there is not a sudden sharp edge transition between the two bore diameters.

With a belly construction in its cold state, the cylinder bore 12 has a diameter $D_2$ in the annular port areas that is greater than the standard diameter D of the rest of the cylinder bore. However, as the engine thermally cycles, inward thermal expansion of the port bridges 29i and 29e occurs and the difference in bore diameters reduces as the belly-honed areas 30 approach the standard bore diameter D. This construction has the effect of reducing blow-by and preventing oil consumption that could result if the inward expansion in the port areas were not mitigated. However, a price is paid for this construction, which is seen in FIGS. 3B and 4.

Figure 3B:
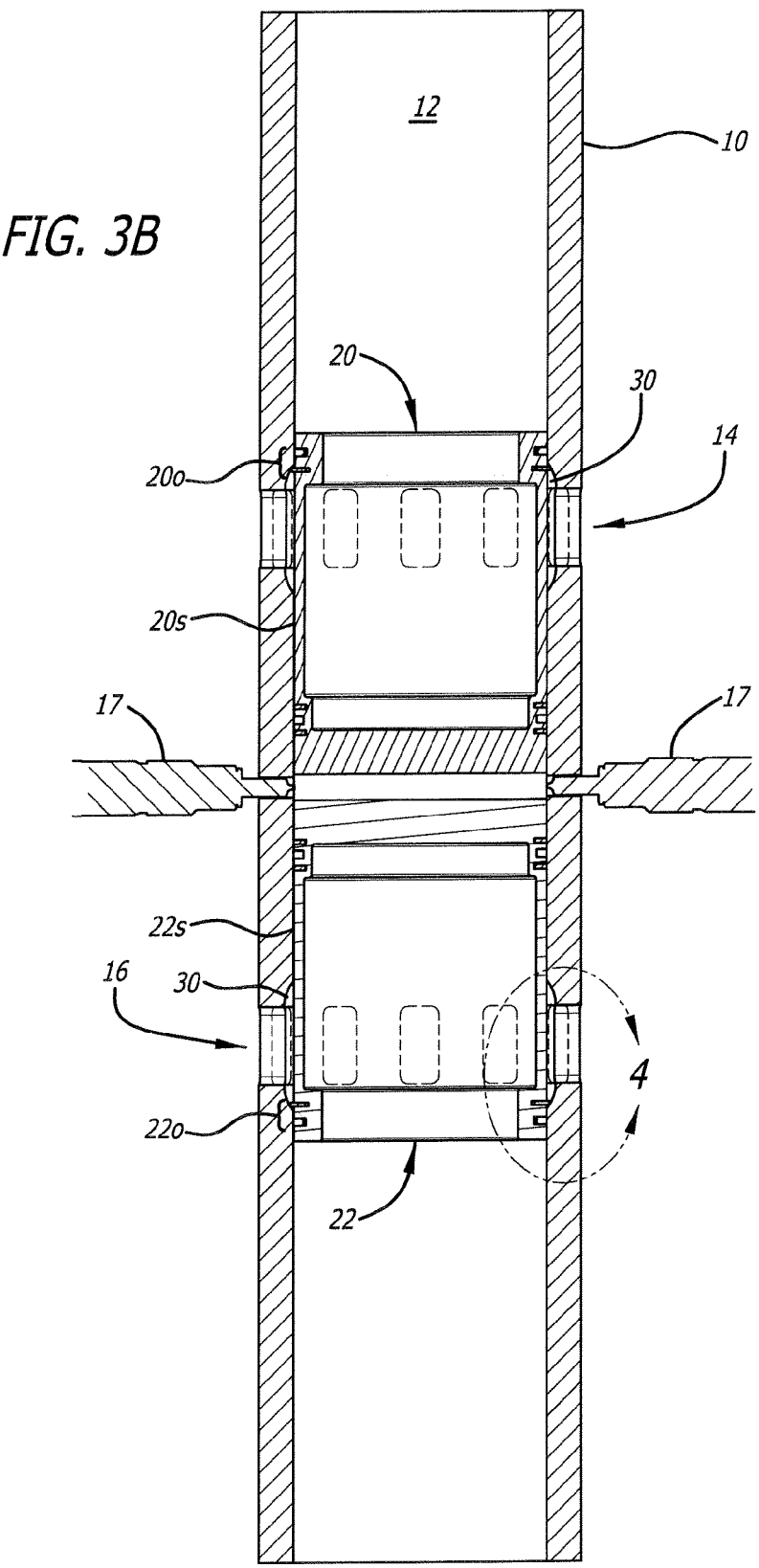
FIG. 3B shows the ported cylinder of FIG. 3A with opposed pistons at or near TDC locations in the cylinder bore.
Figure 4:
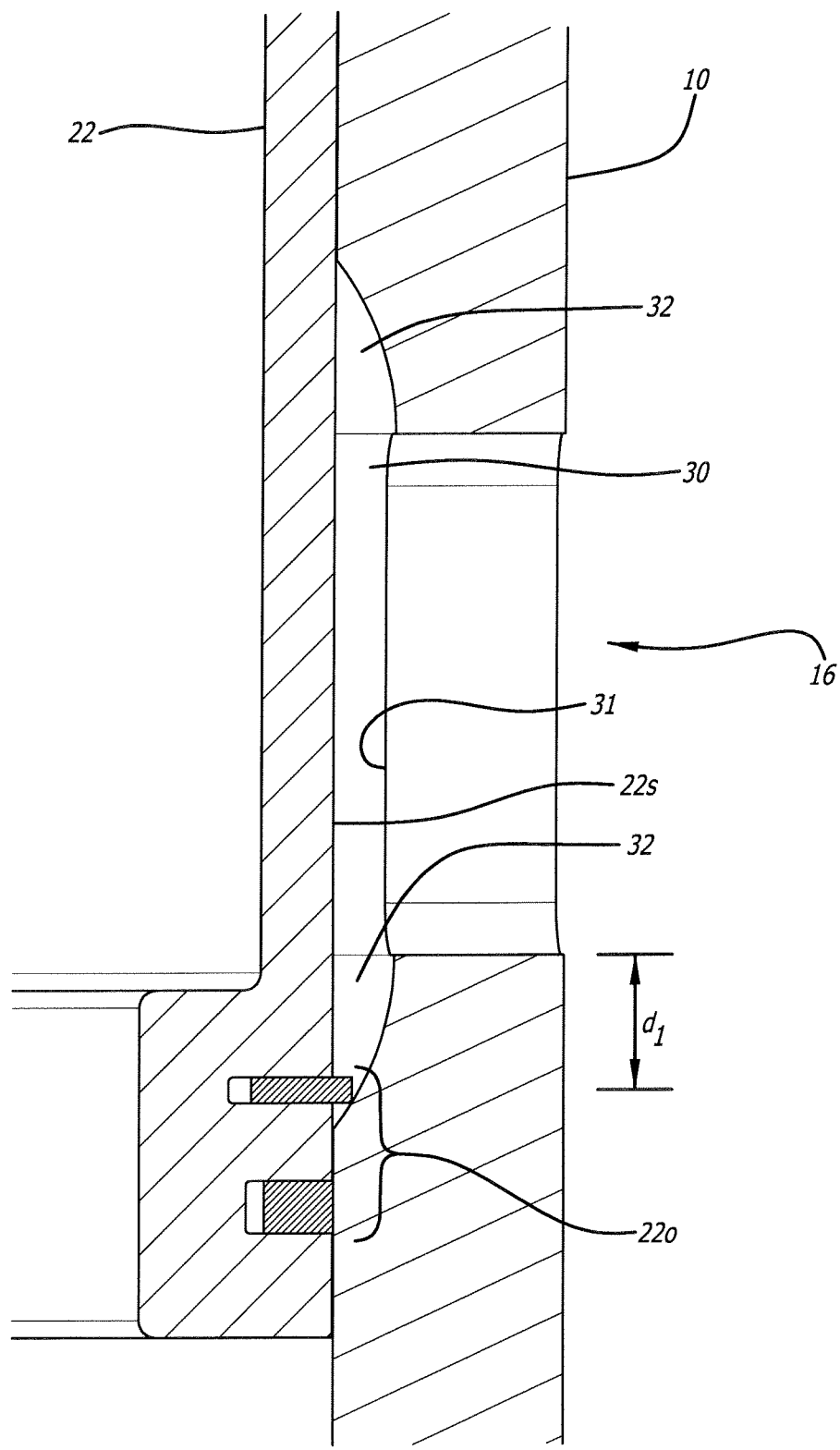
FIG. 4 is a magnified view of a portion of the ported cylinder of FIG. 3B showing a location of a piston oil scraper ring with respect to one of the trenched annular areas.

With reference to FIG. 3B, if the oil scraper rings 22i, 22e enter the belly areas 30 their end gaps may open circumferentially into the increased diameter, which raises risks of ring clipping, oil seepage into the ports, breach of the pressure barrier between the crankcase and the exhaust port, and so on. To avoid these risks, the oil scraper rings 22i, 22e must be kept outside the belly trenches 30 when the pistons 20 and 22 are at their TDC positions. This is best seen in FIG. 4 which shows the location of the innermost oil scraper ring 22o in reference to the belly trench 30 when the piston 22 is at TDC. As the figure shows, the innermost oil scraper ring is separated from the outer edges of the port openings by a distance $d_1$. This separation imposes a lower limit on the length of the piston. As a result of requiring the oil scraper rings for each piston to be located outside the belly trench, the cylinder 10 must be long enough to accommodate the lengths of the piston skirts 20s, 22s. One consequence for an engine of the Junkers Jumo type (Pirault, J. P. and Flint, M., *Opposed Piston Engines: Evolution, Use, and Future Applications*, pp. 55-113, SAE International, ISBN 978-0-7680-1800-4, 2009, doi: 10.4271/R-378.) in which two crankshafts are disposed in parallel with one crankshaft linked to the exhaust pistons and the other to the intake pistons is that the crank centers must be moved further outward from the cylinders than if the bore was of a single diameter from end-to-end, which requires increasing the lengths of the piston connecting rods. These factors end up contributing to an engine that will be taller than would have been required without the belly construction.

Figure 5A:
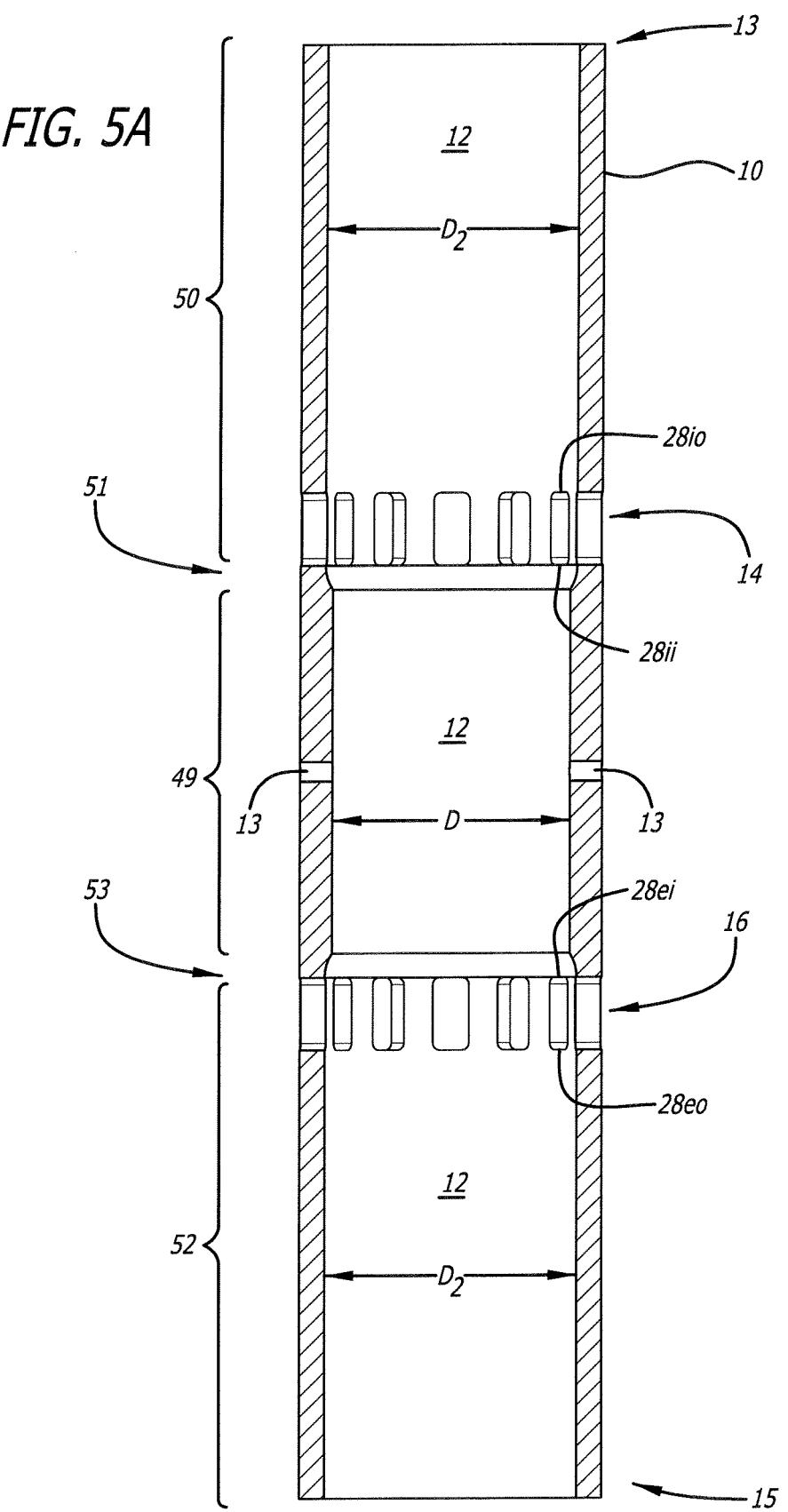
FIG. 5A is a cross sectional view of a ported cylinder of an opposed-piston engine showing a bore with a diameter that transitions from a standard size in a central portion of to a greater size starting in the general area of an inner edge of each port and continuing outward toward open ends of the cylinder.

Another solution to the problem of ring/port interaction during thermal cycling is to modify the construction of the cylinder 10 according to FIG. 5A. With this construction, the lengthwise constraints imposed by the belly construction of FIG. 3A are eliminated without surrendering the solution the problem of port expansion.

As is illustrated in FIG. 5A, the bore 12 has a first ("standard") bore diameter D in a central portion 49 of the bore 12 between the intake and exhaust ports 14 and 16, where the combustion chamber is formed, where the TDC positions of the pistons are located, and where fuel injector ports 13 are located. The contiguous intake and exhaust end portions 50 and 52 of the bore 12 have a second diameter $D_2$, larger than the first diameter D and extending from the inner edges 28ii, 28ei of the port openings to respective open ends 13, 15 of the cylinder 10. The bore diameter transitions continuously between D and $D_2$ in a transition zone 51 of the central portion 49 adjacent the inner edges 28ii of the intake port openings 28i and in a transition zone 53 of the central portion adjacent inner edges 28ei of the exhaust port openings 28e. One method for forming a ported cylinder with the dual-diameter construction of FIG. 5 is referred to as transition honing. In this honing technique, the cylinder bore is initially honed to a standard diameter and then starting at some longitudinal distance inboard of the port areas the bore is further honed an additional amount continuously from inner edges of the ports to the outer ends of the cylinder.

Figure 5B:
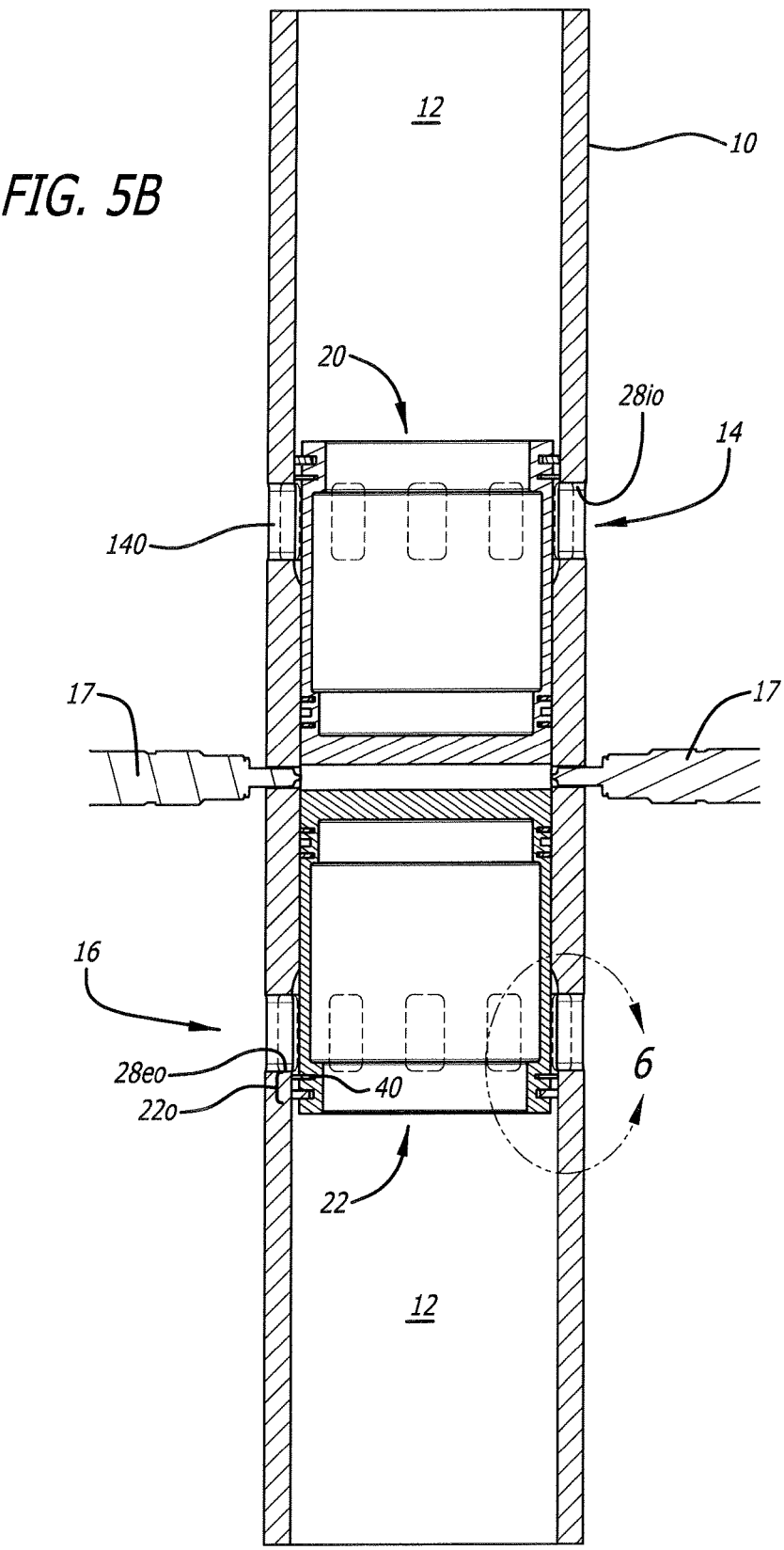
FIG. 5B shows the ported cylinder of FIG. 5A with opposed pistons at or near TDC locations in the cylinder bore.
Figure 6:
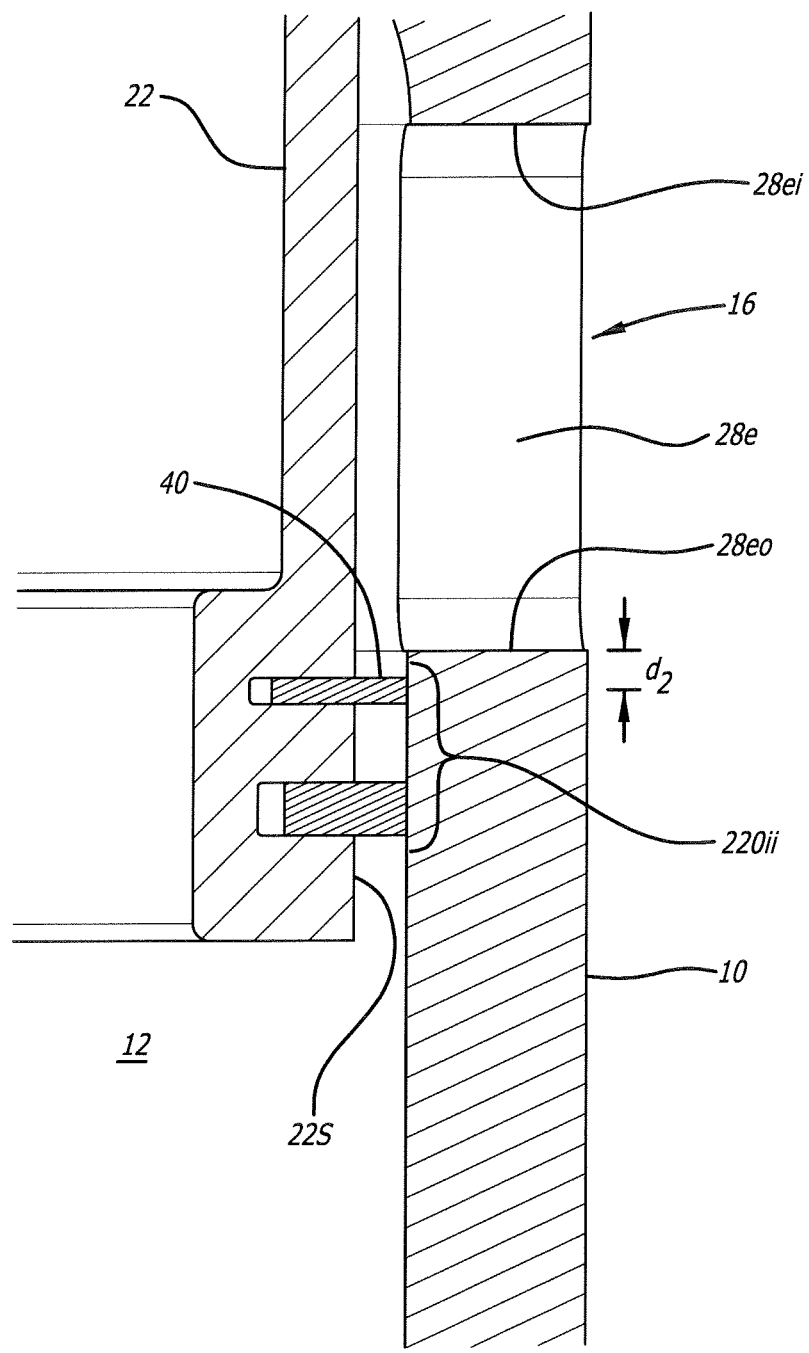
FIG. 6 is a magnified view of a portion of the cylinder of FIG. 5B showing a location of a piston oil scraper ring with respect to a respective bore diameter transition area.

With reference to FIG. 5B, the oil scraper rings 20o and 220 are kept outside of the ports 14 and 16 when the pistons 20 and 22 are at their TDC positions, but are closer to the outer edges 28io and 28eo of the port openings 28i and 28e. This is best seen in FIG. 6 which shows the location of the innermost oil scraper ring 40 with reference to the outer edge 28eo when the piston 22 is at TDC. In this regard, the "innermost" oil scraper ring is the oil scraper ring that is closest to the port when the piston is at top dead center. As the figure shows, the innermost oil scraper ring is separated from the outer edges of the port openings by a distance $d_2$. As a result of allowing the oil scraper rings 22o for each piston to be located nearer the outer edges 28io and 28eo of the port openings 28i and 28e than is permitted with the belly construction of FIG. 3A, the length of the cylinder 10 can be shortened due to the reduced lengths of the piston skirts 20s, 22s achievable with the dual diameter construction illustrated in FIG. 5A. One beneficial result for an opposed-piston engine of the Jumo type is that crank centers can be moved inward toward the cylinders thus decreasing the length of the piston connecting rods. More generally, these factors end up contributing to an opposed-piston engine design that can be shortened in the longitudinal direction of the cylinders more than can be achieved with the belly construction.

In some aspects of the dual diameter construction of the cylinder 10 shown in FIGS. 5A and 5B, a first piston 20 is in operable engagement with the bore 12 for moving between a top dead center position in the central portion 49 of the bore and a bottom dead center position in the intake end 50; this piston may be called the "intake piston". The intake piston 20 includes an oil scraper ring 20o disposed on its skirt so as to be adjacent an outer edge 28io of the intake port 14, without contacting the intake port, when the intake piston is at its top dead center position. A second piston 22 is in operable engagement with the bore 12 for moving between a top dead center position in the central portion 49 and a bottom dead center position in the exhaust end 52; this piston may be termed the "exhaust piston". The exhaust piston 22 includes an oil scraper ring 22o disposed on its skirt so as to be adjacent an outer edge 28eo of the exhaust port, without contacting the exhaust port, when the exhaust piston 22 is at its top dead center position.

For an illustrative example of the dimensional benefits realized with the dual-diameter construction of FIG. 5A, presume a particular two-stroke cycle, opposed-piston engine design that specifies a cylinder liner formed of class 35 grey iron having a standard bore diameter of 98.425 mm in which pistons formed of 4140 steel alloy are disposed. The port openings measure 10 mm between inner and outer edges.

With belly honing, annular trenches as per FIG. 3A can be formed in the port areas to a bore diameter of 98.455 mm. Each trench includes a middle band containing a circumferential array of port openings and bridge ends and occupying 10 mm of cylinder length. The middle band is flanked by sloped transition zones, each occupying 10 mm of cylinder length. Each trench thus occupies 30 mm of cylinder length. To prevent it from opening circumferentially, the piston is long to ensure that the innermost oil scraper ring remains at the edge of the lower transition zone, 5-8 mm outboard of the outer port edges, when the piston is at top dead center. In other words, $d_1$ in FIG. 4 is in the range of 5 mm≤$d_1$≤8 mm.

With transition honing, the dual-diameter embodiment of FIG. 5A can be constructed such that the bore diameter transitions from 98.425 mm to 98.455 mm through a respective zone inboard of the inner edges of each port. Presume that oil scraper rings sized for the larger bore diameter are specified to remain at least 1 mm outboard of the outer edges of each port when the piston is at top dead center; in other words, $d_2$ in FIG. 6 is at least 1 mm. It should be evident that the dual-diameter construction of FIG. 5A allows a shortening of piston length by as much as 7 mm when compared to the annular trench construction of FIG. 3A. As a result of the reduction in lengths of the two opposed pistons, the cylinder liner can shortened by 14 mm, which, in turn permits reduction of the corresponding dimension of the engine.

The dual-diameter construction illustrated in FIG. 5A affords several other advantages over the belly construction illustrated in FIG. 3A. As is the case with the belly construction, as thermal cycling of the engine occurs, the additional enlarged bore diameter in the area of the ports will experience inward expansion thereby reducing the difference in diameters of the bore so as to mitigate blow by, piston land contact to the bridges, excessive compression ring wear as well as reducing oil consumption incidents. However, this inward expansion will be most evident in the port areas and will be less in the areas extending from the ports to the open ends of the cylinder liner. Therefore, as the piston compression rings move across and then outside the ports, when the pistons move toward BDC and start to slow down, there will be less ring-to-bore friction because the bore diameter will be slightly larger in this area.

Another advantage afforded by the dual-diameter construction lies in the fact that the transition from standard to larger bore diameter occurs at a crank angle (CA) where the pistons are still travelling towards BDC at a high velocity. Desirably, the transition from standard bore size to the larger bore size will occur at a crank angle (CA) of approximately 93° after minimum volume (AMV) of the combustion chamber. The inherent opposed-piston 0-90° crank angle performance makes this a desirable operating point at which to begin the transition.

Although principles of ported cylinder constructions have been described with reference to presently preferred embodiments, it should be understood that various modifications can be made without departing from the spirit of the described principles. Accordingly, the patent protection accorded to these principles is limited only by the following claims.

The invention claimed is:

1. A ported cylinder of an opposed-piston engine, comprising:
   a cylinder liner with a bore and longitudinally-spaced intake and exhaust ports;
   the intake and exhaust ports opening through the cylinder liner to the bore; and,
   the cylinder liner having a central portion with one or more injection ports and end portions contiguous with the central portion, in which an intake end portion includes the intake port and an intake end of the cylinder liner and an exhaust end portion includes the exhaust port and an exhaust end of the cylinder liner;
   wherein the bore has a first diameter throughout the central portion, and a second diameter, greater than the first diameter throughout each of the intake and exhaust end portions.

2. The ported cylinder of claim 1, in which the bore diameter transitions continuously from the first to the second diameter in a first transition zone of the central portion adjacent an inner edge of the intake port and in a second transition zone of the central portion adjacent an inner edge of the exhaust port.

3. The ported cylinder of claim 1 in which the bore has the second diameter in the intake end portion from an inner edge of the intake port to an open intake end of the cylinder liner and in the exhaust end portion from an inner edge of the exhaust port to an open exhaust end of the cylinder liner.

4. The ported cylinder of claim 1 in combination with an exhaust piston in operable engagement with the bore for moving between a top dead center position in the central portion and a bottom dead center position in the exhaust end portion, in which the exhaust piston includes a skirt and an oil scraper ring disposed on the skirt to be adjacent an outer edge of the exhaust port when the exhaust piston is at its top dead center position.

5. The ported cylinder of claim 4 in combination with an intake piston in operable engagement with the bore for moving between a top dead center position in the central portion and a bottom dead center position in the intake end portion, in which the intake piston includes a skirt and an oil scraper ring disposed on the skirt to be adjacent an outer edge of the intake port when the intake piston is at its top dead center position.

6. The ported cylinder of claim 1 in combination with an intake piston in operable engagement with the bore for moving between a top dead center position in the central portion and a bottom dead center position in the intake end portion, in which the intake piston includes a skirt and an oil scraper ring disposed on the skirt to be adjacent an outer edge of the intake port when the intake piston is at its top dead center position.

7. An opposed-piston engine including at least one ported cylinder according to any one of claims 1-6.

8. A ported cylinder of an opposed-piston engine, comprising:
   a bore and longitudinally-spaced intake and exhaust ports;
   the intake and exhaust ports opening through the cylinder to the bore; and,
   the cylinder having a central portion with one or more injection ports and end portions contiguous with the central portion, in which an intake end portion includes an inner edge of the intake port that adjoins the central portion and an outer edge positioned between the inner edge and an open intake end and an exhaust end portion includes an inner edge of the exhaust port that adjoins the central portion and an outer edge positioned between the inner edge and an open exhaust end;

wherein the bore has a first diameter throughout the central portion, and a second diameter, greater than the first diameter throughout each of the intake and exhaust end portions.

9. The ported cylinder of claim 8, in which the bore diameter transitions continuously from the first to the second diameter in a first transition zone of the central portion adjacent the inner edge of the intake port and in a second transition zone of the central portion adjacent the inner edge of the exhaust port.

10. The ported cylinder of claim 8 in which the bore has the second diameter in the intake end portion from the inner edge of the intake port to the open intake end and in the exhaust end portion from the inner edge of the exhaust port to the open exhaust end.

11. The ported cylinder of claim 8 in combination with an exhaust piston in operable engagement with the bore for moving between a top dead center position in the central portion and a bottom dead center position in the exhaust end portion, in which the exhaust piston includes a skirt and an oil scraper ring disposed on the skirt to be adjacent the outer edge of the exhaust port when the exhaust piston is at its top dead center position.

12. The ported cylinder of claim 11 in combination with an intake piston in operable engagement with the bore for moving between a top dead center position in the central portion and a bottom dead center position in the intake end portion, in which the intake piston includes a skirt and an oil scraper ring disposed on the skirt to be adjacent the outer edge of the intake port when the intake piston is at its top dead center position.

13. The ported cylinder of claim 8 in combination with an intake piston in operable engagement with the bore for moving between a top dead center position in the central portion and a bottom dead center position in the intake end portion, in which the intake piston includes a skirt and an oil scraper ring disposed on the skirt to be adjacent the outer edge of the intake port when the intake piston is at its top dead center position.

14. An opposed-piston engine including at least one ported cylinder according to any one of claims 8-13.

15. A cylinder and piston assembly for an opposed-piston engine, comprising:
   a cylinder with a bore and longitudinally-spaced intake and exhaust ports, the intake port including inner and outer edges, and the exhaust port including inner and outer edges; and,
   first and second pistons disposed for opposing movement in the bore between respective bottom and top dead center positions;
   the bore including a central portion of a diameter D that transitions to a larger diameter $D_2$ near the inner edges of the intake and exhaust ports and continues past the outer edges of the intake and exhaust ports to respective ends of the cylinder;
   the first piston including a crown with one or more compression rings and a skirt with an oil scraper ring, in which the oil scraper ring is positioned on the skirt to be adjacent the outer edge of the intake port, without contacting the intake port, when the first piston is at top dead center; and,
   the second piston including a crown with one or more compression rings and a skirt with an oil scraper ring, in which the oil scraper ring is positioned on the skirt to be adjacent the outer edge of the exhaust port, without contacting the exhaust port, when the second piston is at top dead center.

16. The cylinder and piston assembly of claim 15 in which each oil scraper ring is an innermost oil scraper ring.

17. The cylinder and piston assembly of claim 15 in which the bore has the second diameter in an intake end portion from the inner edge of the intake port to an open intake end of the cylinder and in an exhaust end portion from the inner edge of the exhaust port to an open exhaust end of the cylinder.

18. The cylinder and piston assembly of claim 17 in which each oil scraper ring is an innermost oil scraper ring.

19. The cylinder and piston assembly of claim 17 further including one or more injector port openings in the central portion.

20. The cylinder and piston assembly of claim 15 further including one or more injector port openings in the central portion.

* * * * *

UNITED STATES PATENT AND TRADEMARK OFFICE
CERTIFICATE OF CORRECTION

| | | |
|---|---|---|
| PATENT NO. | : 8,935,998 B1 | Page 1 of 1 |
| APPLICATION NO. | : 14/028423 | |
| DATED | : January 20, 2015 | |
| INVENTOR(S) | : Michael S. Tebbe | |

It is certified that error appears in the above-identified patent and that said Letters Patent is hereby corrected as shown below:

On the title page, item (54) and in the specification, col. 1, line 1, should read:

COMPACT, PORTED CYLINDER CONSTRUCTION FOR AN OPPOSED-PISTON ENGINE

Signed and Sealed this
Second Day of June, 2015

Michelle K. Lee
*Director of the United States Patent and Trademark Office*